UNITED STATES PATENT OFFICE.

EUGEN SPEIDEL, OF PFORZHEIM, GERMANY, ASSIGNOR, BY MESNE ASSIGNMENTS, TO GENERAL CHAIN COMPANY, OF PROVIDENCE, RHODE ISLAND, A CORPORATION OF MASSACHUSETTS.

PROCESS OF SOLDERING CHAIN-LINKS.

1,308,741.     Specification of Letters Patent.     Patented July 1, 1919.

No Drawing.     Application filed February 23, 1912.   Serial No. 679,428.

*To all whom it may concern:*

Be it known that I, EUGEN SPEIDEL, a subject of the German Emperor, and residing at Pforzheim, Germany, have invented certain new and useful Improvements in Processes of Soldering Chain-Links, of which the following is a specification.

The present invention has reference to the manufacture of ornamental or other metal chains from wire provided with a core of solder, and it relates more specifically to an improved process for preventing intersoldering of the links of such solder-cored chains.

In my U. S. Patent No. 1,017,818 I have described a process for soldering chain links of solder-cored wire, which essentially consists in applying to the work piece an antisoldering, filmlike coating for the purpose of preventing intersoldering of the individual chain links. This antisoldering coating, as there described, entails the step of passing the work piece through acids, alkalis, chlorids, or the like.

I, now, have found that it is possible to simplify and generally improve the described process by leaving out the step of specially treating the work piece in such baths, so that according to the present invention the chain is simply cleansed of the deoxidizer in the well known manner and then fed directly to the soldering flame. The heat developed during the soldering operation, but previous to the fusing point of the solder core, will produce on the surface of the work piece, except at the deoxidized faces of the joints, the oxid filmlike coating requisite to prevent the oozing solder from spreading onto adjacent parts.

The metal alloy preferably used in this line of manufacture is copper-silver, and heating of the work piece in the presence of air or oxygen soon produces on its surface the desired oxid film in the form of copper oxid. If the chain or the like is passed through ozone, then black silver oxid is obtained.

In carrying out my new process I first treat the work piece, for instance a chain made up of interlinked rings, with any suitable soldering agent, such as borax or the like; this deoxidizer is then removed from the surface of the links except at the joints by shaking, rubbing or brushing the chain during or after the succeeding drying process, during which latter the solvent of the deoxidizer is evaporated; the chain is then fed to the soldering device, where, upon the links gradually heating-up, formation of the antisoldering, filmlike coating takes place. Upon the heat being raised to the fusing point of the solder core the joints become shut in the well known manner.

Obviously there may be also an independent heating device ahead of the soldering device proper, for heating the work piece to the temperature where the oxid compound is formed.

The soldered chain is then cleaned in alkali baths and by other means well known in the art, and it is then passed on for further treatment.

What I claim is:—

1. Process of preventing intersoldering of solder-cored metal chain links, consisting in applying a deoxidizer to the work piece, removing it again therefrom except at the joints, preheating the work piece until oxidation takes place on the surface of the metal, and then heating the work piece to soldering heat, substantially as set forth.

2. Process of preventing intersoldering of solder-cored metal chain links, consisting in applying a deoxidizer to the work piece, removing it again therefrom except at the joints, heating the work piece to oxidation temperature, and then raising the heat until the core of solder melts and closes the joints, substantially as set forth.

3. Process of preventing intersoldering of solder-cored metal chain links, consisting in applying a deoxidizer to the work piece, removing it again therefrom except at the joints, heating the work piece in the presence of gaseous oxidizing agents, and then raising the heat to soldering temperature, substantially as set forth.

4. Process of preventing intersoldering of solder-cored metal chain links, consisting in applying a deoxidizer to the work piece, removing it again therefrom except at the joints, heating the work piece until a compound of the metal component of the shell of the links is produced on the surface of the links, and then continuing the heat to the fusing point of the solder core, substantially as set forth.

5. In the method of automatically soldering chains, applying a flux to the joints of the links, removing the surplus flux, and subjecting the joints to an oxidizing heat capable of fusing the solder.

6. A process of soldering chain made from solder wire, consisting in coating the chain with a soldering salt, removing the said coating except from the joint surfaces, and then closing the joints by heating the chain with said joints so coated and the rest of its surface bare or uncoated with soldering salt.

7. A process of soldering chain made from solder wire, consisting in coating the chain with a soldering salt, removing the said coating except from the joint surfaces of the links, and then closing the joints with a soldering flame.

8. A process of soldering chain made from solder wire, consisting in coating the joint surfaces of the links with a soldering salt, removing the surplus soldering salt, and then closing the joints with a soldering flame.

In testimony whereof I affix my signature in presence of two witnesses.

EUGEN SPEIDEL.

Witnesses:
A. O. TITTMANN,
S. H. SHANK.